US012728429B2

(12) United States Patent
Fukazawa

(10) Patent No.: US 12,728,429 B2
(45) Date of Patent: Sep. 8, 2026

(54) LIQUID DISCHARGE APPARATUS, LIQUID DISCHARGE METHOD, AND STORAGE MEDIUM

(71) Applicant: Hikaru Fukazawa, Kanagawa (JP)

(72) Inventor: Hikaru Fukazawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 641 days.

(21) Appl. No.: 18/177,998

(22) Filed: Mar. 3, 2023

(65) Prior Publication Data

US 2023/0285989 A1 Sep. 14, 2023

(30) Foreign Application Priority Data

Mar. 8, 2022 (JP) ................................ 2022-035527

(51) Int. Cl.

| | |
|---|---|
| ***B05B 1/08*** | (2006.01) |
| ***B05B 1/16*** | (2006.01) |
| ***B05B 12/04*** | (2006.01) |
| ***B05B 13/04*** | (2006.01) |
| *B25J 11/00* | (2006.01) |

(52) U.S. Cl.

CPC ............ *B05B 1/086* (2013.01); *B05B 1/1609* (2013.01); *B05B 12/04* (2013.01); *B05B 13/0431* (2013.01); *B05B 13/0452* (2013.01); *B25J 11/0075* (2013.01)

(58) Field of Classification Search

USPC ................ 118/313–315, 302, 679–682, 684

See application file for complete search history.

(56) References Cited

U.S. PATENT DOCUMENTS

| | | | |
|---|---|---|---|
| 8,662,635 | B2 | 3/2014 | Yuda et al. |
| 2010/0328385 | A1 | 12/2010 | Shibata et al. |
| 2019/0143695 | A1 | 5/2019 | Cabello et al. |

(Continued)

FOREIGN PATENT DOCUMENTS

| | | | |
|---|---|---|---|
| CN | 108688329 A | * 10/2018 | ............. B41J 2/175 |
| JP | 2004-142382 | 5/2004 | |
| JP | 2014-159102 | 9/2014 | |

(Continued)

OTHER PUBLICATIONS

English Translation CN-108688329A (Year: 2018).*

(Continued)

*Primary Examiner* — Yewebdar T Tadesse

(74) *Attorney, Agent, or Firm* — IPUSA, PLLC

(57) ABSTRACT

A liquid discharge apparatus includes a liquid discharge head that discharges a liquid from multiple nozzle holes to apply the liquid to an object and circuitry that causes the liquid discharge head to discharge the liquid from a first number of the multiple nozzle holes to a first area at a start of an application of the liquid to the object as a first discharge, discharge a first total amount of the liquid to a receptacle different from the object before the first discharge as a first dummy discharge, discharge the liquid from a second number of the multiple nozzle holes to a second area at the start of the application as a second discharge, discharge a second total amount of the liquid larger than the first total amount to the receptacle before the second discharge as a second dummy discharge. The second number is larger than the first number.

4 Claims, 8 Drawing Sheets

(56) References Cited

U.S. PATENT DOCUMENTS

2020/0039217 A1 2/2020 Kaiba et al.

FOREIGN PATENT DOCUMENTS

JP 2019171754 A * 10/2019 .............. B41J 2/175
JP 2020-023177 2/2020
WO 2020/204101 10/2020

OTHER PUBLICATIONS

English Translation JP-2019171754A (Year: 2019).*
Extended European Search Report for 23159182.7 mailed on Jul. 14, 2023.
Japanese Office Action for 2022-035527 mailed on Nov. 18, 2025.

* cited by examiner

FIG. 2

200
500
500A
504
NVRAM
502
ROM
PROGRAM
501
CPU
503
RAM
508
HDD
510
HEAD CONTROL UNIT
10
DISCHARGE HEAD
511
ROBOT CONTROL UNIT
31
ROBOT DRIVER
32
ENCODER SENSOR
506
EXTERNAL I/F
505
ASIC
507
I/O UNIT
PC
600
601
RIP UNIT
602
RENDERING UNIT
18
SENSORS
15
POSITION MEASURING DEVICE
INPUT DEVICE
603
1000

LIQUID DISCHARGE APPARATUS, LIQUID DISCHARGE METHOD, AND STORAGE MEDIUM

CROSS-REFERENCE TO RELATED APPLICATION

This patent application is based on and claims priority pursuant to 35 U.S.C. § 119(a) to Japanese Patent Application No. 2022-035527, filed on Mar. 8, 2022, in the Japan Patent Office, the entire disclosure of which is hereby incorporated by reference herein.

BACKGROUND

Technical Field

Embodiments of the present disclosure relate to a liquid discharge apparatus, a liquid discharge method, and a storage medium storing a plurality of instructions.

RELATED ART

In the related art, a liquid discharge apparatus includes a liquid discharge head that discharges a liquid and applies the liquid to an object. Such a liquid discharge apparatus is used for various applications such as coating of the object and image formation on a recording medium.

SUMMARY

Embodiments of the present disclosure describe an improved liquid discharge apparatus that includes a liquid discharge head and circuitry. The liquid discharge head has multiple nozzle holes and discharges a liquid from the multiple nozzle holes to apply the liquid to an object. The circuitry causes the liquid discharge head to discharge the liquid from a first number of the multiple nozzle holes to a first area of the object at a start of an application of the liquid to the object as a first discharge operation, discharge a first total amount of the liquid to a receptacle different from the object before the first discharge operation as a first dummy discharge operation, discharge the liquid from a second number of the multiple nozzle holes to a second area of the object at the start of the application of the liquid as a second discharge operation, and discharge a second total amount of the liquid larger than the first total amount to the receptacle before the second discharge operation as a second dummy discharge operation. The second number is larger than the first number.

According to other embodiments of the present disclosure, there are provided a liquid discharge method and a non-transitory storage medium storing a plurality of instructions which, when executed by one or more processors, causes the processors to perform the liquid discharge method. The method includes discharging a liquid from multiple nozzle holes of a liquid discharge head to apply the liquid to an object, discharging the liquid from a first number of the multiple nozzle holes to a first area of the object at a start of an application of the liquid to the object as a first discharge operation, discharging a first total amount of the liquid to a receptacle different from the object before the first discharge operation as a first dummy discharge operation, discharging the liquid from a second number of the multiple nozzle holes to a second area of the object at the start of the application of the liquid as a second discharge operation, and discharging a second total amount of the liquid larger than the first total amount to the receptacle before the second discharge operation as a second dummy discharge operation. The second number is larger than the first number.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 2 is a schematic view of the liquid discharge apparatus according to the present embodiment;

Figure 1:
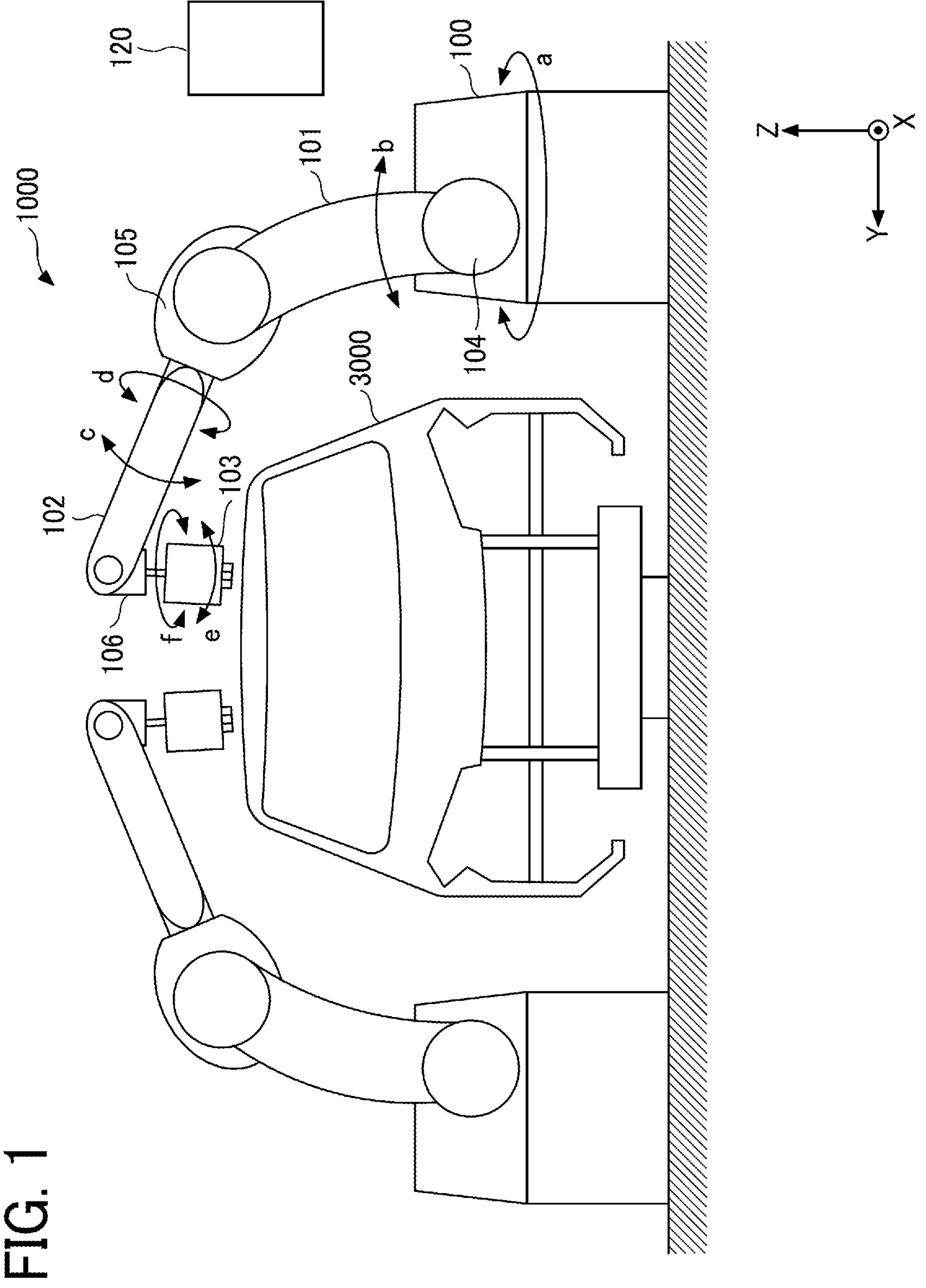
FIG. 1 is a schematic view of a coating robot including a liquid discharge apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Outline of Liquid Discharge Apparatus

First, an outline of a liquid discharge apparatus is described with reference to FIG. 1. FIG. 1 is a schematic view illustrating an overall configuration of a liquid discharge apparatus according to an embodiment of the present disclosure. The liquid discharge apparatus illustrated in FIG. 1 is a coating robot 1000 that coats, for example, a body of an automobile. An X-axis direction, a Y-axis direction, and a Z-axis direction are indicated by arrows in FIG. 1, which are three directions intersecting with each other. The X-axis direction is, for example, a front-back direction of the body of the automobile which is an object to be coated. The Y-axis direction is a width direction of the body of the automobile. The Z-axis direction is the up-down direction in FIG. 1.

As illustrated in FIG. 1, the coating robot 1000 is installed so as to face an object 3000 such as a surface of the body of the automobile. The coating robot 1000 includes a base 100, a first arm 101, a second arm 102, and a head unit 103. The first arm 101 is coupled to the base 100. The second arm 102 is coupled to the first arm 101. The head unit 103 is coupled to the second arm 102. The coating robot 1000 includes a first joint 104, a second joint 105, and a third joint 106. The first joint 104 couples the base 100 and the first arm 101. The second joint 105 couples the first arm 101 and the second arm 102. The third joint 106 couples the second arm 102 and the head unit 103.

The coating robot 1000 is, for example, a multi-articulated robot. The base 100 is rotatable in the direction indicated by arrow a about a rotation shaft extending in the Z-axis direction. The base 100 supports one end of the first arm 101 via the first joint 104. The first arm 101 is swingable in the direction indicated by arrow b about a rotation shaft parallel to an X-Y plane. The other end of the first arm 101 supports one end of the second arm 102 via the second joint 105. The second arm 102 is swingable in the direction indicated by arrow c about a rotation shaft parallel to the X-Y plane. In addition, the second arm 102 is rotatable in the direction indicated by arrow d about a rotation shaft extending in the longitudinal direction of the second arm 102.

The other end of the second arm 102 supports the head unit 103 via the third joint 106. The head unit 103 is swingable in the direction indicated by arrow e about a rotation shaft extending in the direction intersecting the longitudinal direction of the second arm 102. In addition, the head unit 103 is rotatable in the direction indicated by arrow f about a rotation shaft extending in the direction from the third joint 106 toward the head unit 103.

The coating robot 1000 freely moves the head unit 103 relative to the object 3000. The coating robot 1000 accurately positions the head unit 103 relative to the object 3000. The coating robot 1000 accurately positions the head unit 103 at a coating position for coating the object 3000. The coating robot 1000 discharges paint toward the object 3000 to coat the object 3000 with the paint.

In the present embodiment, the system configuration in which one coating robot 1000 is disposed on each side of the object 3000 is illustrated in FIG. 1, but the coating robot 1000 is not limited to being disposed on each side of the object 3000. The number of coating robots 1000 installed may be one, or three or more with respect to the object 3000.

Figure 2:
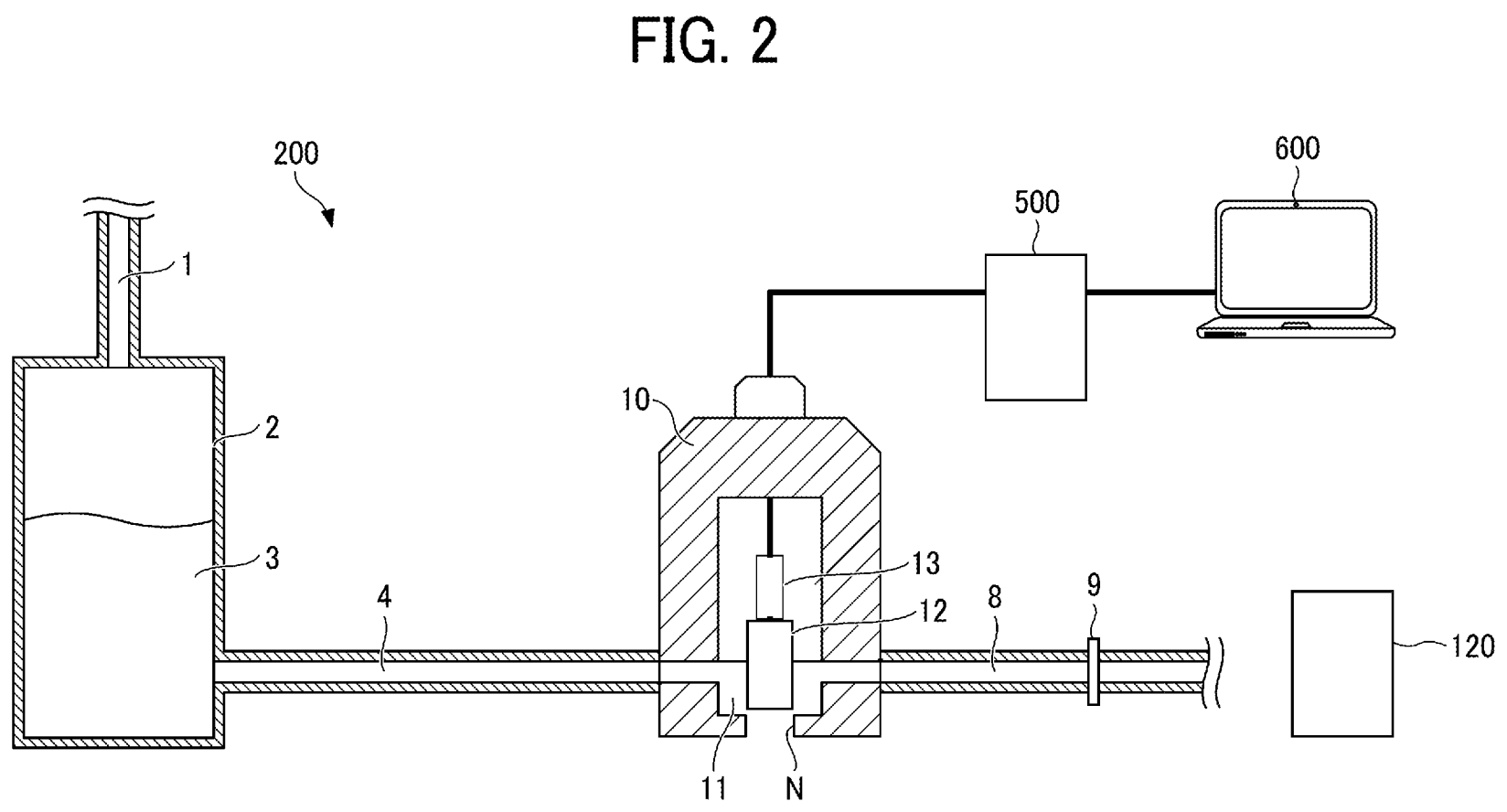

FIG. 2 is a schematic view of a liquid discharge apparatus 200. The coating robot 1000 includes the liquid discharge apparatus 200. The liquid discharge apparatus 200 performs a liquid discharge method. The liquid discharge apparatus 200 includes a tank 2, a discharge head (liquid discharge head) 10, and a controller 500. For example, the liquid discharge apparatus 200 is accommodated in the head unit 103 illustrated in FIG. 1, or only the discharge head 10 of the liquid discharge apparatus 200 may be accommodated in the head unit 103. The liquid discharge apparatus 200 includes a pipe 1, a pipe 4, and a pipe 8.

The tank 2 is a container that stores a liquid to be supplied to the discharge head 10. The tank 2 stores paint 3 which is an example of the liquid. The pipe 1 is connected to the tank 2. For example, a compressor is connected to the pipe 1. The compressor supplies pressurized air to the tank 2. The compressor can increase the pressure inside the tank 2 via the pipe 1. The pipe 1 functions as a pressure supply path that applies a pressure to the paint 3 (liquid) in the tank 2. The pipe 4 is a channel connecting the tank 2 and the discharge head 10. The paint 3 in the tank 2 flows through the pipe 4 and is supplied to the discharge head 10. The pipe 4 functions as a liquid supply channel that supplies the paint 3 to the discharge head 10.

The discharge head 10 has a nozzle hole N and includes a liquid chamber 11 and a valve 12. The discharge head 10 includes a valve driver 13 that drives the valve 12. The nozzle hole N communicates with the liquid chamber 11. The liquid chamber 11 stores the paint 3 supplied from the tank 2. The valve 12 is disposed in the liquid chamber 11. The valve 12 opens and closes the nozzle hole N. The valve 12 is, for example, a needle valve. The discharge head 10 discharges the paint 3 in the liquid chamber 11 from the nozzle hole N. The discharge head 10 discharges the pressurized paint 3 to apply the paint 3 to the object 3000. The valve driver 13 drives (opens and closes) the valve 12 in accordance with a drive signal transmitted from a controller 500. The valve 12 approaches the nozzle hole N to close the nozzle hole N. The valve 12 moves away from the nozzle hole N to open the nozzle hole N.

The controller 500 and a personal computer (PC) 600 control liquid discharge by the discharge head 10. The controller 500 and the PC 600 operate the valve 12 to discharge the paint 3. The pipe 8 communicates with the discharge head 10. The pipe 8 includes a valve 9. When the liquid chamber 11 is filled with the paint 3, the valve 9 is opened to release the pressure in the liquid chamber 11. When the paint 3 is discharged from the nozzle hole N of the discharge head 10, the valve 9 is closed.

Hardware Configuration

Figure 3:
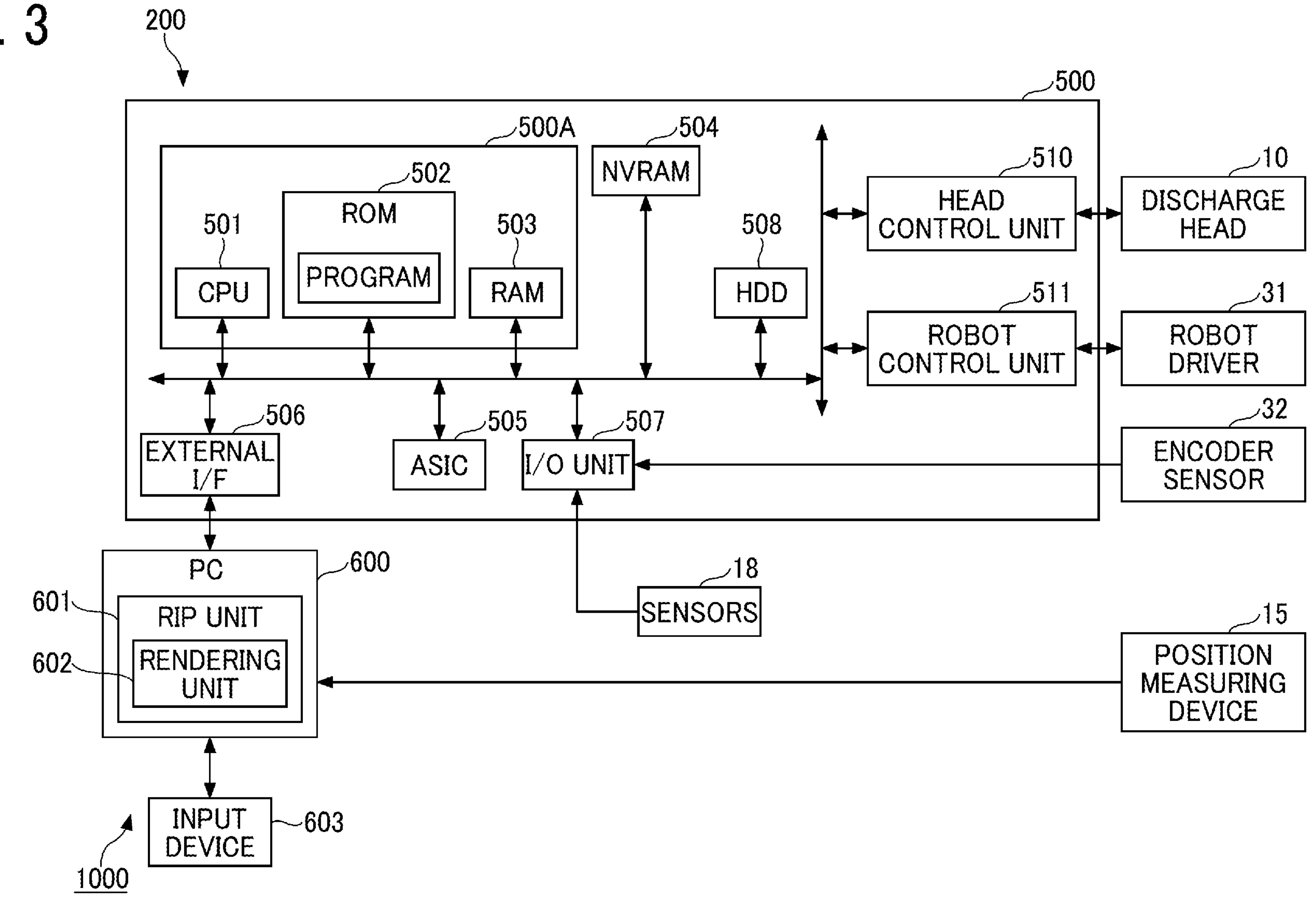
FIG. 3 is a block diagram illustrating a hardware configuration of the liquid discharge apparatus according to the present embodiment.

A description is given below of a hardware configuration of the liquid discharge apparatus 200 according to the present embodiment with reference to FIG. 3. FIG. 3 is a block diagram illustrating the hardware configuration of the liquid discharge apparatus 200 according to the present embodiment. The hardware configuration illustrated in FIG. 3 may include additional components if desired. The hardware configuration may not include the components illustrated in FIG. 3 if desired.

The liquid discharge apparatus 200 includes the controller 500. The controller 500 includes a central processing unit (CPU) 501, a read only memory (ROM) 502, a random access memory (RAM) 503, a non-volatile random access memory (NVRAM) 504, and a hard disk drive (HDD) 508. The CPU 501 controls the entire liquid discharge apparatus 200. The ROM 502 stores various programs for causing the CPU 501 to control the liquid discharge and various data for coating. A program for scanning the discharge head 10 is stored in the ROM 502.

The RAM 503 temporarily stores data such as a position of the discharge head 10. The NVRAM 504 is a non-volatile memory and can retain data even while a power supply of the liquid discharge apparatus 200 is shut off. The controller 500 includes a main controller 500A, and the main controller 500A includes the CPU 501, the ROM 502, and the RAM 503.

The controller 500 includes an application specific integrated circuit (ASIC) 505. The ASIC 505 processes input and output signals for controlling the entire liquid discharge apparatus 200. The ASIC 505 performs various kinds of signal processing on image data. The ASIC 505 also performs image processing on images input to the controller 500.

The controller 500 includes an external interface (I/F) 506 for transmitting and receiving data to and from the PC 600 which is an example of an external device. The PC 600 includes, for example, a raster image processor (RIP) unit 601. The RIP unit 601 includes a rendering unit 602.

An input device 603 is connected to the PC 600. A position measuring device 15 is also connected to the PC 600. The memories such as the ROM 502, the RAM 503, the NVRAM 504, and the HDD 508 store the image date and date on a coating area received from the PC 600. The data on the coating area includes data such as the size of the object 3000 to be coated.

The controller 500 further includes an input/output (I/O) unit 507 for receiving detection signals output from the sensors 18. Examples of the sensors 18 include a temperature sensor, a pressure sensor, and a viscosity sensor.

The controller 500 further includes a head control unit 510 that controls driving of the discharge head 10. The head control unit 510 controls a driver of the discharge head 10. The head control unit 510 controls the driver of the discharge head 10 to causes the discharge head 10 to discharge the paint 3 (liquid). The head control unit 510 controls driving of the valve 12 of the discharge head 10. The discharge head 10 controls the pressure in the tank 2. The discharge head 10 controls driving of the valve 9. The head control unit 510 executes various types of controls related to the discharge head 10.

The controller 500 further includes a robot control unit 511. The robot control unit 511 controls a robot driver 31 in accordance with a command from the CPU 501. The coating robot 1000 includes the robot driver 31. The robot driver 31 includes, for example, a motor. The robot driver 31 drives the rotation shaft of the base 100. Similarly, the robot driver 31 drives the rotation shaft of the first arm 101, the rotation shaft of the second arm 102, the rotation shaft of the head unit 103, the rotation shaft of the first joint 104, the rotation shaft of the second joint 105, and the rotation shaft of the third joint 106.

The coating robot 1000 includes an encoder sensor 32. The controller 500 receives a signal from the encoder sensor 32 via the I/O unit 507. The encoder sensor 32 is provided for each of the first joint 104, the second joint 105, and the third joint 106. Each of the first joint 104, the second joint 105, and the third joint 106 includes a slit that rotates together with the rotation shaft. The encoder sensor 32 optically detects the slit. The encoder sensor 32 detects rotation angles of the first joint 104, the second joint 105, and the third joint 106.

The coating robot 1000 includes the position measuring device 15. The position measuring device 15 measures the position of the discharge head 10. Examples of the position measuring device 15 include a three-dimensional (3D) sensor and a 3D camera. The position measuring device 15 measures the position of the discharge head 10 in the X and Y directions. The position measuring device measures an inclination of the discharge head 10. The position measuring device 15 detects a coating start position to start coating. The position measuring device 15 may detect the size of the object 3000 to be coated.

The position measuring device 15 may include a laser displacement meter. The position measuring device 15 can measure a length of the object 3000 in the Z-axis direction. The position measuring device 15 may measure a height position of a roof of the object 3000. The position measuring device 15 outputs the measurement result to the PC 600.

The PC 600 acquires position data of the discharge head 10 from the position measuring device 15. The controller 500 receives the position data of the discharge head 10 via the PC 600. The controller 500 may receive data from the position measuring device 15 via the I/O unit 507. The input device 603 is connected to the PC 600. The input device 603 can input image data and position data to the PC 600. The position measuring device 15 may input data of the measured position of the discharge head 10 to the PC 600.

The PC 600 generates a coating route for the coating robot 1000. The rendering unit 602 decomposes coating data of a coating portion into scan data for each scan. The coating portion is, for example, the coating area to be coated on a surface of the object 3000. The rendering unit 602 determines the number of nozzles to be driven among multiple nozzles of the discharge head 10 in each scan and whether to perform dummy discharge. The number of nozzles to be driven is the number of nozzle holes N from which the paint 3 (liquid) is discharged by the discharge head 10. In the dummy discharge, the discharge head discharges the paint 3 (liquid) from the nozzle holes N before being scanned. The rendering unit 602 determines whether to perform the dummy discharge.

The liquid discharge apparatus 200 determines a valve opening time during scan. A valve opening time control unit 231 of the liquid discharge apparatus 200 determines the valve opening time during scan in accordance with data on a print time corresponding to the number of nozzles to be driven, which has been created in advance. The data on the print time corresponding the number of nozzles to be driven is determined in advance based on pressure fluctuations of the paint 3 (liquid). The "pressure fluctuation of the paint 3" is, for example, pressure fluctuations of liquid in the discharge head 10.

The PC 600 includes the RIP unit 601. The RIP unit 601 performs image processing in accordance with a color profile and user setting. The RIP unit 601 includes the rendering unit 602. The rendering unit 602 decomposes the coating data of the coating portion for the object 3000 into the scan data (image data) for each scan (e.g., for each movement of the discharge head 10 in the main scanning direction). The object 3000 is, for example, the body of the automobile. The term "each scan" means, for example, each movement of the discharge head 10 in the main scanning direction. The "main scanning direction" may be, for example, the same as the longitudinal direction of the object 3000 or may be an arbitrary direction.

The input device 603 is connected to the PC 600. A user can input various data to the PC 600 with the input device 603. The PC 600 receives image data and coordinate data indicating the coating area of the object 3000 to be coated via the input device 603.

The PC 600 receives a signal from the input device 603 to set a coating mode. The user can select the coating mode by operating the input device 603. The PC 600 receives a signal from the input device 603 to set the coating area. The PC 600 set the coating start position and a coating end position. The PC 600 set a start timing of coating. The user can change various settings by operating the PC 600 via the input device 603.

The input device 603 includes, for example, a keyboard, a mouse, a touch panel, and the like. The PC 600 acquires the position data of the discharge head 10 from the position measuring device 15 of the coating robot 1000. The PC 600 generates the coating route of the discharge head 10 based on the acquired position data. The coating route includes the position data on a movement route along which the discharge head 10 moves. The coating route may include other data. A coating system is an example of a liquid discharge system. The coating system includes the liquid discharge apparatus 200 and the PC 600.

Functional Configuration

Figure 4:
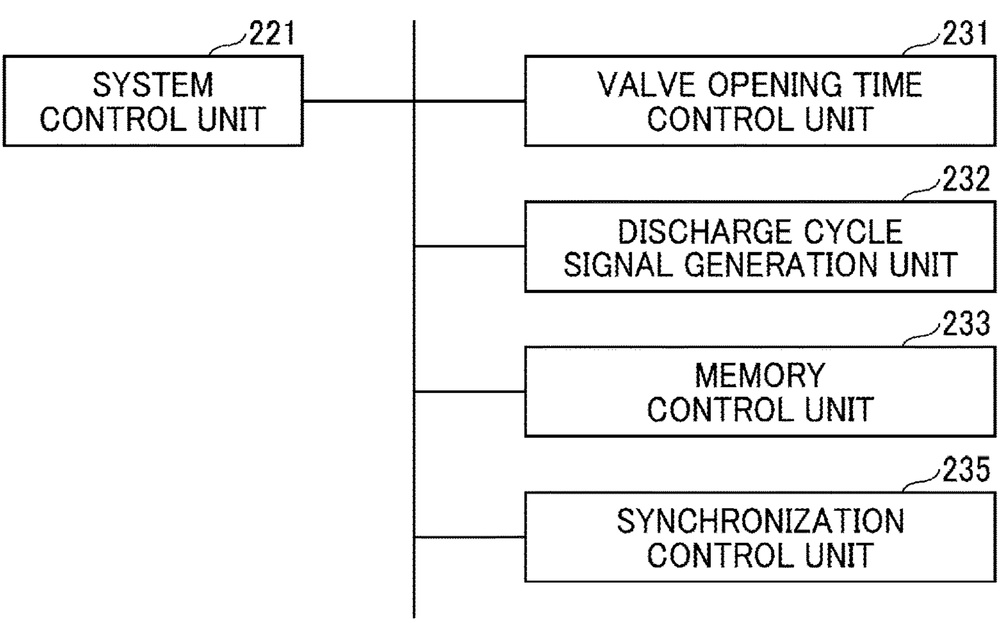
FIG. 4 is a functional block diagram of the liquid discharge apparatus according to the present embodiment.

A description is given below of a functional configuration of the liquid discharge apparatus 200 according to the present embodiment with reference to FIG. 4. FIG. 4 is a functional block diagram of the liquid discharge apparatus 200 according to the present embodiment. The CPU 501 illustrated in FIG. 3 executes programs stored in a storage unit such as the ROM 502 to implements functions of a system control unit 221, the valve opening time control unit 231, a discharge cycle signal generation unit 232, a memory control unit 233, a data storage unit, and a synchronization control unit 235 illustrated in FIG. 4.

The system control unit 221 controls an entire operation of the coating system. The system control unit 221 receives the image data of the coating area and the command signal from the PC 600 and controls the entire operation of the coating system. The valve opening time control unit 231 controls the valve opening time of the valve 12. The valve opening time is a length of time during which the valve 12 opens the nozzle hole N and the paint 3 (liquid) can be discharged. The memory control unit 233 controls the memories such as the ROM 502, the RAM 503, the NVRAM 504, and the HDD 508.

The discharge cycle signal generation unit 232 generates a discharge cycle signal based on an output signal output from the encoder sensor 32 and data indicating the resolution of the image data output from the PC 600. The discharge cycle signal indicates a discharge cycle of the paint 3 discharged from the nozzle hole N. The synchronization control unit 235 synchronizes the movement of the multiple coating robots 1000 with the discharge operation of the paint 3 by the discharge head 10 based on the image data, coating instruction signal, and the like received from the PC 600.

The head control unit 510 receives the discharge cycle signal and controls the discharge operation of the paint 3 (liquid) by the discharge head 10 based on the received discharge cycle signal. The robot control unit 511 receives a synchronization control signal and controls the robot driver 31 based on the received synchronization control signal. The controller 500 controls the robot driver 31 to move the first arm 101, the second arm 102, and the head unit 103 to desired positions.

The system control unit 221, the valve opening time control unit 231, the discharge cycle signal generation unit 232, the memory control unit 233, the data storage unit, and the synchronization control unit 235 can be implemented by software such as a program stored in the storage unit. All or some of the system control unit 221, the valve opening time control unit 231, the discharge cycle signal generation unit 232, the memory control unit 233, the data storage unit, and the synchronization control unit 235 may be implemented by hardware such as an integrated circuit (IC).

The program may be recorded in a computer-readable storage medium such as a compact disc read only memory (CD-ROM) or a flexible disk (FD) as file data in an installable or an executable format, and may be loaded into the liquid discharge apparatus 200 via such a storage medium.

Alternatively, the program may be recorded in a computer-readable storage medium such as a compact disc-recordable (CD-R), a digital versatile disc (DVD), a Blu-ray (registered trademark) disc, or a semiconductor memory, and may be loaded into the liquid discharge apparatus 200 via such a storage medium. The program to be installed may be downloaded into the liquid discharge apparatus 200 via a network such as the Internet. The program may be incorporated in the ROM 502 or the like in the liquid discharge apparatus 200 in advance. The controller 500 may also implement the functions by the PC 600. Similarly, the PC 600 may implement the functions by the controller 500.

Generation of Coating Route

Figure 5:
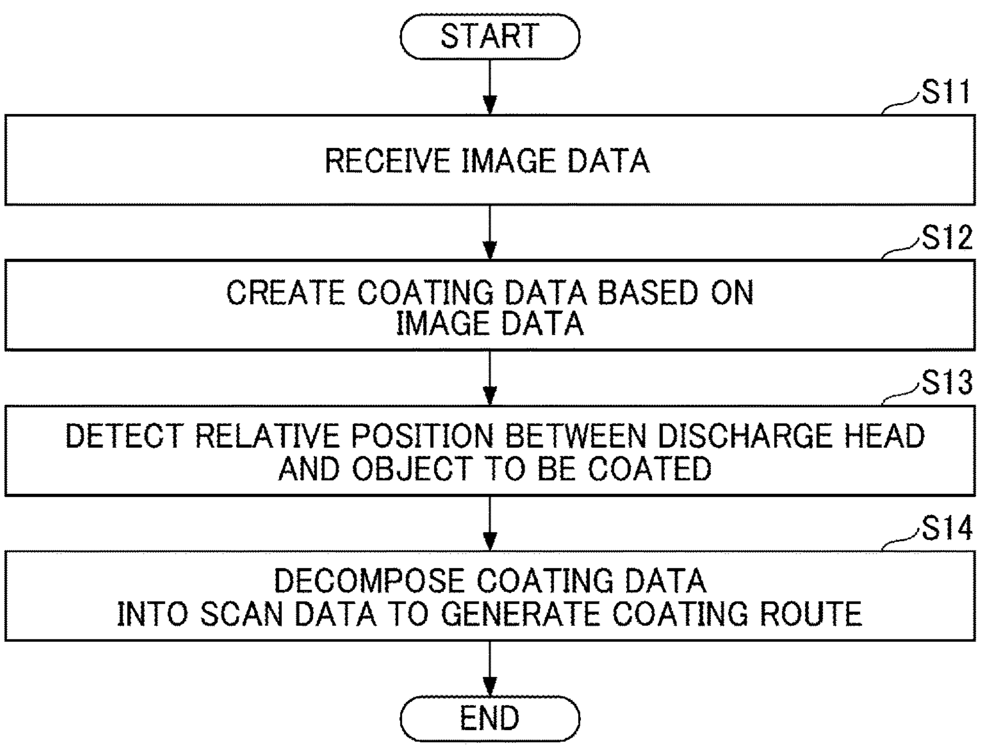
FIG. 5 is a flowchart illustrating a process of generating a coating route according to the present embodiment.

A generation of the coating route is described below. FIG. 5 is a flowchart illustrating a process of generating the coating route. The PC 600 generates the coating route based on the received image date and the relative position between the discharge head and the object 3000 as described below.

The PC 600 receives image data, for example, via the input device 603 (step S11). The image data is obtained by capturing an image of the object 3000, for example. Next, the PC 600 creates coating date based on the image date (step S12). The coating data includes, for example, position data indicating an area on the surface of the object 3000 to be coated.

The position measuring device 15 detects the relative position between the discharge head 10 and the object 3000 to be coated (step S13). The position measuring device 15 outputs data on the detected relative position to the PC 600.

The PC 600 decomposes the coating data into the scan data and generates the coating route (step S14). The coating route includes the position data on the movement route along which the discharge head 10 moves. The PC 600 outputs data on the generated coating route to the controller 500. The controller 500 controls the robot driver 31 in accordance with the coating route.

Comparative Example

A comparative example is described below. In a liquid discharge apparatus according to the comparative example, a coating quality (liquid application quality) may deteriorate at the beginning of coating due to thixotropy of paint and a drop in liquid pressure of the paint caused by the liquid discharge.

The paint may be, for example, for coating the body of the automobile. The "thixotropy" is a property exhibited by an intermediate substance between a gel which is a plastic solid and a sol which is a non-Newtonian liquid. The "thixotropy" refers to a property of changing the viscosity of liquid (paint) with time. The paint having thixotropy has a high viscosity relative to a shear stress immediately after the start of the liquid discharge. The viscosity of the paint having thixotropy gradually decreases with time.

In a liquid discharge apparatus that pressurizes the paint and discharges droplets of the paint, the liquid pressure of the paint drops after the liquid discharge. After a certain period of time, the liquid pressure of the paint in the discharge head 10 balances with a supply pressure of the paint, and the pressure drop stabilizes. The liquid pressure in the discharge head 10 gradually decreases immediately after the start of coating in the liquid discharge apparatus 200.

Viscosity and Liquid Pressure of Paint

Figure 6:
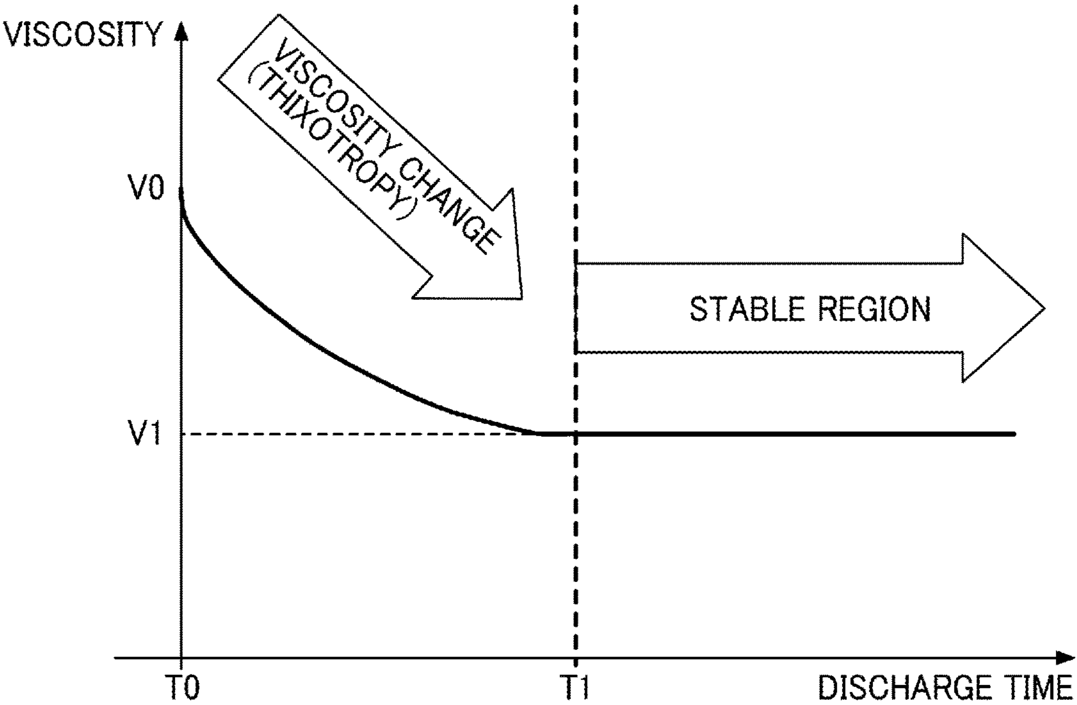
FIG. 6 is a graph illustrating a relation between a discharge time of droplets of paint and a viscosity of the paint according to the present embodiment.
Figure 7:
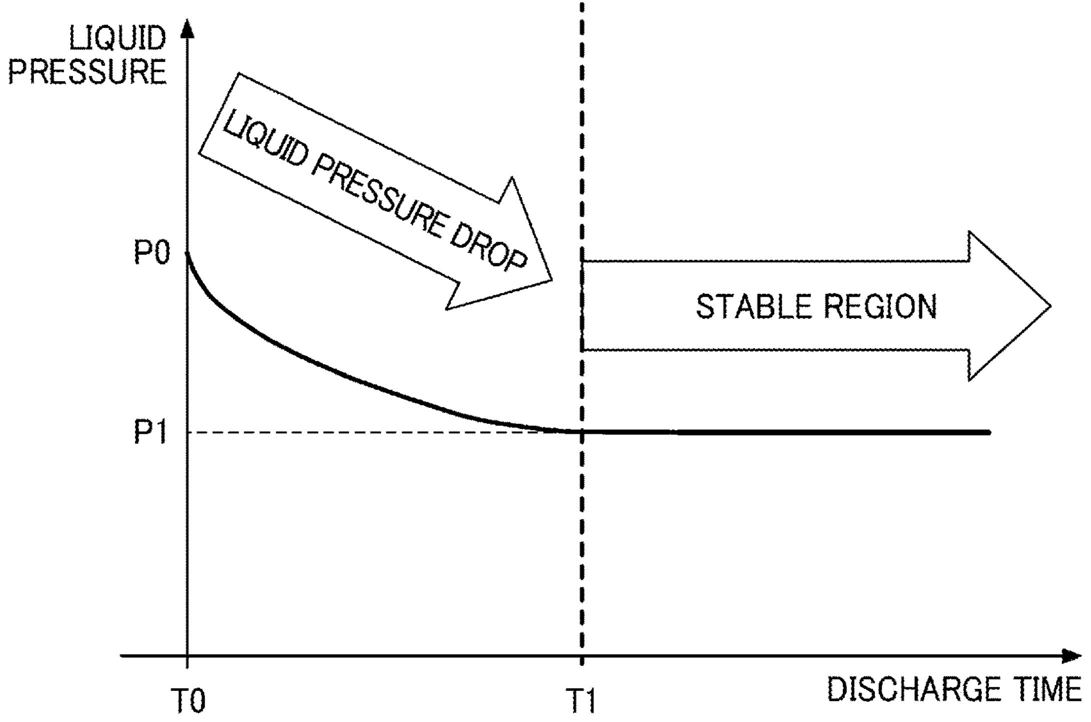
FIG. 7 is a graph illustrating a relation between the discharge time of the droplets of the paint and a liquid pressure of the paint according to the present embodiment.

Relations between a discharge time of droplets of the paint, and the viscosity and the liquid pressure of the paint is described below with reference to FIGS. 6 and 7. FIG. 6 is a graph illustrating the relation between the discharge time of droplets of the paint and the viscosity of the paint. FIG. 7 is a graph illustrating the relation between the discharge time of droplets of the paint and the liquid pressure of the paint. In FIG. 6, the horizontal axis represents the discharge time of droplets of the paint and the vertical axis represents the viscosity of the paint. In FIG. 7, the horizontal axis represents the discharge time of droplets of the paint and the vertical axis represents the liquid pressure of the paint.

A discharge time T0 is a coating start time in the comparative example. The viscosity and the liquid pressure of the paint gradually decrease from the start of the liquid discharge, that is, the discharge time T0. When a certain discharge time elapses and an amount of discharged paint exceeds a certain value, the viscosity and the liquid pressure of the paint become constant values. Beyond a discharge time T1, the paint stabilizes at a viscosity V1. Beyond the discharge time T1, the paint stabilizes at a liquid pressure P1.

Therefore, in the present embodiment, the liquid discharge apparatus 200 performs a dummy discharge operation before printing. The liquid discharge apparatus 200 performs the dummy discharge operation until the viscosity and the liquid pressure of the paint stabilize. The "dummy discharge operation" refers to an operation of discharging droplets of the paint from the discharge head 10 before printing in which the droplets of the paint are discharged to the object 3000. In the "dummy discharge operation," for example, the droplets of the paint may be discharged to a receptacle 120 (see FIG. 1) for waste liquid. The "printing" refers to an operation of discharging the droplets of the paint onto the object 3000 to coat the object with the paint. The "printing" includes an operation of discharging the droplets of the paint onto the object 3000 to applies the paint to the object 3000 without printing characters.

For example, the memory of the controller 500 stores data indicating the relation between the discharge time and the viscosity of the paint. The memory of the controller 500 stores data indicating the relation between the discharge time and the liquid pressure of the paint. The memory of the controller 500 store data on the number of dummy discharge operations and the amount of discharged droplets of the paint in the dummy discharge operations.

Figure 8:
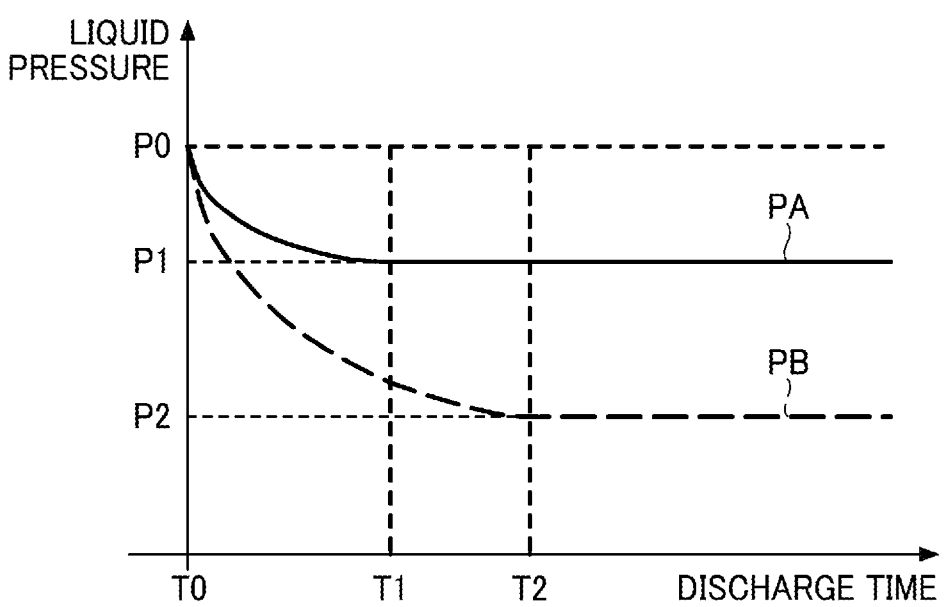
FIG. 8 is a graph illustrating the relation between the discharge time of the droplets of the paint and the liquid pressure of the paint when the number of nozzles to be driven is different.

FIG. 8 is a graph illustrating the relation between the discharge time of the droplets of the paint and the liquid pressure of the paint when the number of nozzles to be driven is different. In FIG. 8, the horizontal axis represents the discharge time of droplets of the paint and the vertical axis represents the liquid pressure of the paint. FIG. 8 illustrates a liquid pressure profile PA when the number of nozzles to be driven is small (case 1) and a liquid pressure profile PB when the number of nozzles to be driven is large (case 2). The "number of nozzles to be driven" refers to the number of nozzle holes N from which droplets of the paint are discharged.

For example, the time until the liquid pressure in the liquid chamber 11 reaches saturation and the saturation liquid pressure vary depending on the number of nozzles to be driven. An amount of waste of the paint, which is discharged to the receptacle 120 in the dummy discharge operation, increases with an increase in the number of nozzles to be driven. The memory of the controller 500 stores the liquid pressure profiles PA and PB corresponding the number of nozzles to be driven in advance.

The controller 500 determines the total amount of the paint discharged in the dummy discharge operation based on the drop in the liquid pressure corresponding to the number of nozzles to be driven. The "total amount of the paint discharged in the dummy discharge operation" is, for example, the sum of flow amount of droplets of the paint discharged from the nozzle holes N corresponding to the number of nozzles to be driven from when the liquid pressure starts to decrease until the liquid pressure stabilizes.

For example, when the number of nozzles to be driven is small (case 1), the total amount of the paint discharged in the dummy discharge operation is the flow amount of droplets of the paint discharged from the nozzle holes N from the discharge time T0 to the discharge time T1. In case 1, the paint has a liquid pressure P0 at the discharge time T0, which drops to the liquid pressure P1 at the discharge time T1. In case 1, the paint stabilizes at the liquid pressure P1 beyond the discharge time T1.

For example, when the number of nozzles to be driven is large (case 2), the total amount of the paint discharged in the dummy discharge operation is the flow amount of droplets of the paint discharged from the nozzle holes N from the discharge time T0 to a discharge time T2. In case 2, the paint has the liquid pressure P0 at the discharge time T0, which drops to the liquid pressure P2 at the discharge time T2. In case 2, the paint stabilizes at the liquid pressure P2 beyond the discharge time T2. The discharge time T2 is greater than the discharge time T1. The liquid pressure P2 is smaller than the liquid pressure P1.

Since the liquid discharge apparatus 200 adjusts the total amount of the paint discharged in the dummy discharge operation corresponding to the number of nozzles to be driven based on the drop in the liquid pressure, the liquid discharge apparatus 200 can coat the object 3000 with the paint having the stable viscosity and liquid pressure while minimizing the total amount of the paint discharged in the dummy discharge operation.

If the liquid pressure reaches the liquid pressure based on the number of nozzles to be used at the start of coating, the number of nozzles or the valve opening time used for the dummy discharge operation may be larger that used for coating. The "start of coating" refers to when the discharge head 10 starts applying the paint to the object 3000 (i.e., at the start of an application of the liquid to the object 3000), or in other words, when the liquid discharge apparatus 200 starts scanning the discharge head 10 to coat the object 3000. In the present embodiment, the "coating start time" is the discharge time T1 in case 1 and is the discharge time T2 in case 2.

Figure 9:
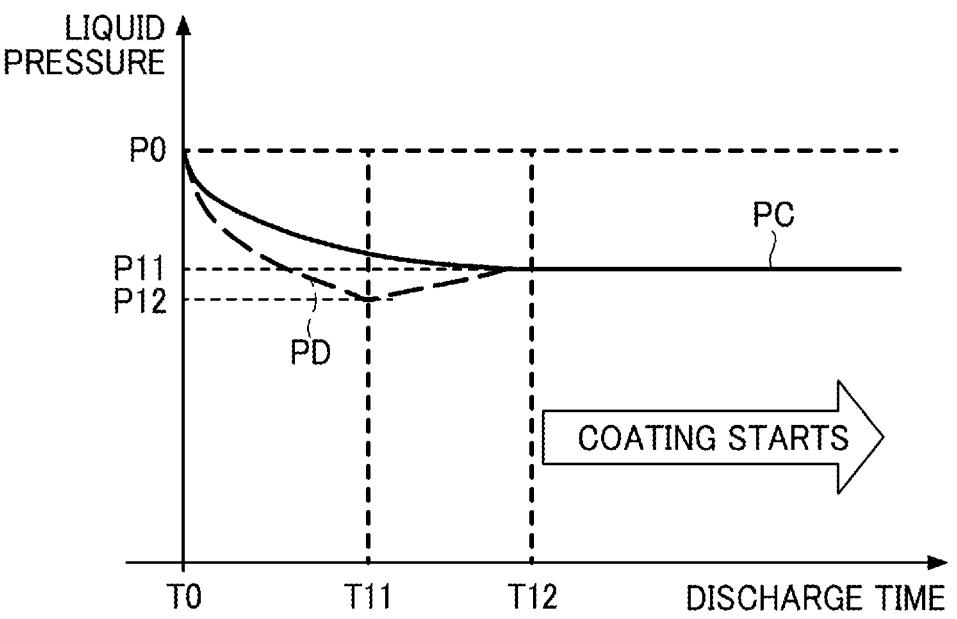
FIG. 9 is a graph illustrating the relation between the discharge time of the droplets of the paint and the liquid pressure of the paint when the number of nozzles to be driven in a dummy discharge operation is larger than that at the time of coating.

FIG. 9 is a graph illustrating the relation between the discharge time of the droplets of the paint and the liquid pressure of the paint when the number of nozzles to be driven in the dummy discharge operation is larger than that used at the time of coating. FIG. 9 illustrates a liquid pressure profile PC when the number of nozzles to be driven at the start of coating is the same as the number of nozzles to be driven in the dummy discharge operation (case 3), and a liquid pressure profile PD when the dummy discharge operation is performed using nozzle holes N equal to or more than the number of nozzles to be driven at the start of coating (case 4). When the valve opening time in the dummy discharge operation is longer than the valve opening time at the start of coating, a liquid pressure profile is similar to the liquid pressure profile PD illustrated in FIG. 9.

In case 3, the paint has the liquid pressure P0 at the discharge time T0, which drops to the liquid pressure P11 at the discharge time T12. In case 3, the paint stabilizes at the liquid pressure P11 beyond the discharge time T12.

In case 4, the paint has the liquid pressure P0 at the discharge time T0, which drops to the liquid pressure P12 at the discharge time T11. As the dummy discharge operation is stopped at the time T11, the liquid pressure increases and reaches the liquid pressure P11 at the time T12. When coating starts from the time T12, the paint stabilizes at the liquid pressure P11.

Figure 10:
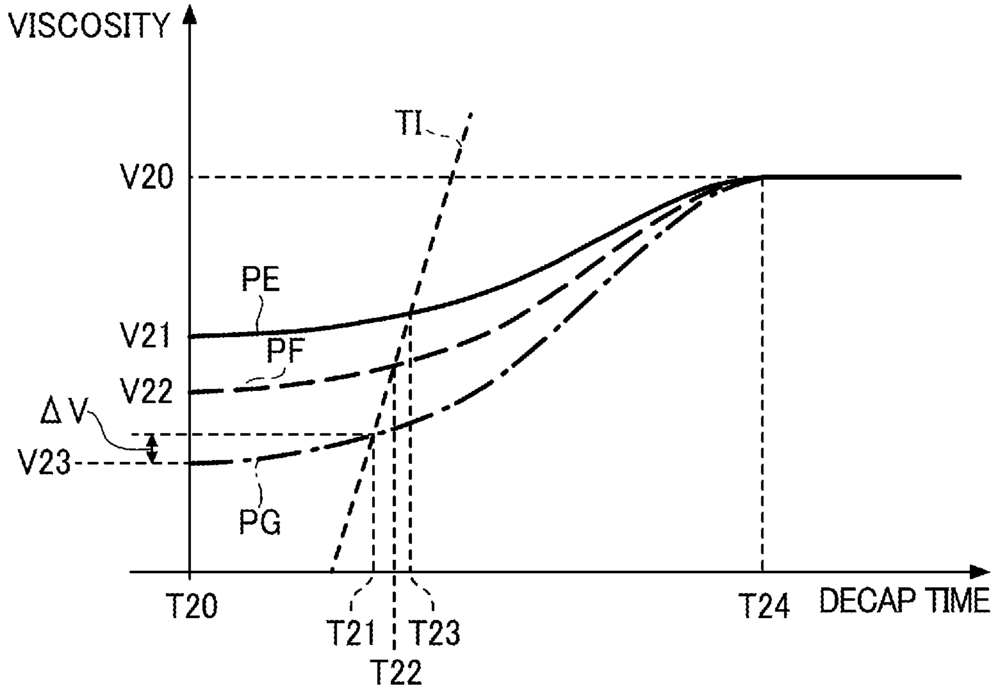
FIG. 10 is a graph illustrating a relation between a decap time and the viscosity of the paint.

As the dummy discharge operation is stopped, the viscosity and the liquid pressure of the paint change so as to approach the state before the dummy discharge operation. Therefore, there is a limit to a decap time before the start of coating. The "decap time" refers to the time of a non-discharge state in which the valve 12 closes the nozzle hole N. With reference to FIG. 10, a description is given below of a relation between the decap time from the end of the dummy discharge operation to the start of coating and the viscosity of the paint at the start of discharge when the viscosity of the paint is dominant.

FIG. 10 is a graph illustrating the relation between the decap time and the viscosity of the paint. In FIG. 10, the horizontal axis represents the decap time, and the vertical axis represents the viscosity of the paint. FIG. 10 illustrates a viscosity profile PE when the number of nozzles to be driven is small (case 5), a viscosity profile PF when the number of nozzles to be driven is medium (case 6), and a viscosity profile PG when the number of nozzles to be driven is large (case 7).

In case 5, the paint has a viscosity V21 at a decap time T20, which slightly increases until a decap time T23. In case 5, an increase in viscosity ΔV from the decap time T20 to the decap time T23 is small and does not affect the coating quality. In case 5, the viscosity of the paint increases after the decap time T23 and reaches a viscosity V20 at a decap time T24. The paint stabilizes at the viscosity V20 beyond the decap time T24.

In case 6, the paint has a viscosity V22 at the decap time T20, which slightly increases until a decap time T22. In case 6, the increase in viscosity ΔV from the decap time T20 to the decap time T22 is small and does not affect the coating quality. In case 6, the viscosity of the paint increases after the decap time T22 and reaches the viscosity V20 at the decap time T24. The paint stabilizes at the viscosity V20 beyond the decap time T24. The decap time T22 is smaller than the decap time T23. The viscosity V22 is smaller than the viscosity V21. In case 6, the viscosity starts increasing faster than in case 5.

In case 7, the paint has a viscosity V23 at the decap time T20, which slightly increases until a decap time T21. In case 7, the increase in viscosity ΔV from the decap time T20 to the decap time T21 is small and does not affect the coating quality. In case 7, the viscosity of the paint increases after the decap time T21 and reaches the viscosity V20 at the decap time T24. The paint stabilizes at the viscosity V20 beyond the decap time T24. The decap time T21 is smaller than the decap time T22. The viscosity V23 is smaller than the viscosity V22. In case 7, the viscosity starts increasing faster than in case 5 and case 6.

The viscosity of the paint slightly increases until a certain time after the decap time starts. The viscosity then increases due to the thixotropy of the paint. The liquid discharge apparatus 200 starts coating within a period during which the viscosity is stable, thereby maintaining a stable discharge amount and a stable droplet speed of the paint immediately after the start of coating.

FIG. 10 illustrates an abnormal discharge occurrence time T1 at which the occurrence of the abnormal discharge is predicted. The abnormal discharge occurrence time T1 decreases with an increase in the number of nozzles to be driven. The abnormal discharge occurrence time T1 may be the minimum time at which an increase in viscosity causes the abnormal discharge. The increase in viscosity ΔV less than a certain value does not affect the coating quality. When the increase in viscosity ΔV exceeds a threshold of the increase in viscosity, the abnormal discharge may occur.

The memory of the controller 500 stores data indicating the relation between the decap time and the viscosity of the paint corresponding to the number of nozzles to be driven as illustrated in FIG. 10. The memory of the controller 500 may store data on the abnormal discharge occurrence time T1. The controller 500 causes the discharge head 10 to discharge droplets of the paint from the nozzle holes N before the abnormal discharge occurrence time T1 elapses, and to start coating. When the droplets of the paint are not discharged from the nozzle holes N, the abnormal discharge occurrence time T1 is longer in case of a small number of nozzles to be driven than in a case of a large number of nozzles to be driven.

The controller 500 can change the time from the end of dummy discharge operation to the start of coating in accordance with the number of nozzles to be driven. When the number of nozzles to be driven is large, the controller 500 shortens the time from the end of the dummy discharge operation to the start of coating as compared with the case in which the number of nozzles to be driven is small. Accordingly, the liquid discharge apparatus 200 can start coating in a state in which the viscosity and the liquid pressure of the paint are stable, thereby obtaining the stable coating quality.

According to the present embodiment, a liquid discharge apparatus such as the liquid discharge apparatus 200 includes a liquid discharge head such as the discharge head 10 and circuitry such as the controller 500. The liquid discharge head has multiple nozzle holes such as the multiple nozzle holes N and discharges a liquid such as the paint 3 from the multiple nozzle holes to apply the liquid to an object such as the object 3000. The circuitry causes the liquid discharge head to discharge the liquid from a first number of the multiple nozzle holes to a first area of the object at a start of an application of the liquid to the object as a first discharge operation, discharge a first total amount of the liquid to a receptacle such as the receptacle 120 different from the object before the first discharge operation as a first dummy discharge operation, discharge the liquid from a second number of the multiple nozzle holes to a second area of the object at the start of the application of the liquid as a second discharge operation, and discharge a second total amount of the liquid larger than the first total amount to the receptacle 120 before the second discharge operation as a second dummy discharge operation. The second number is larger than the first number.

Figure 11:
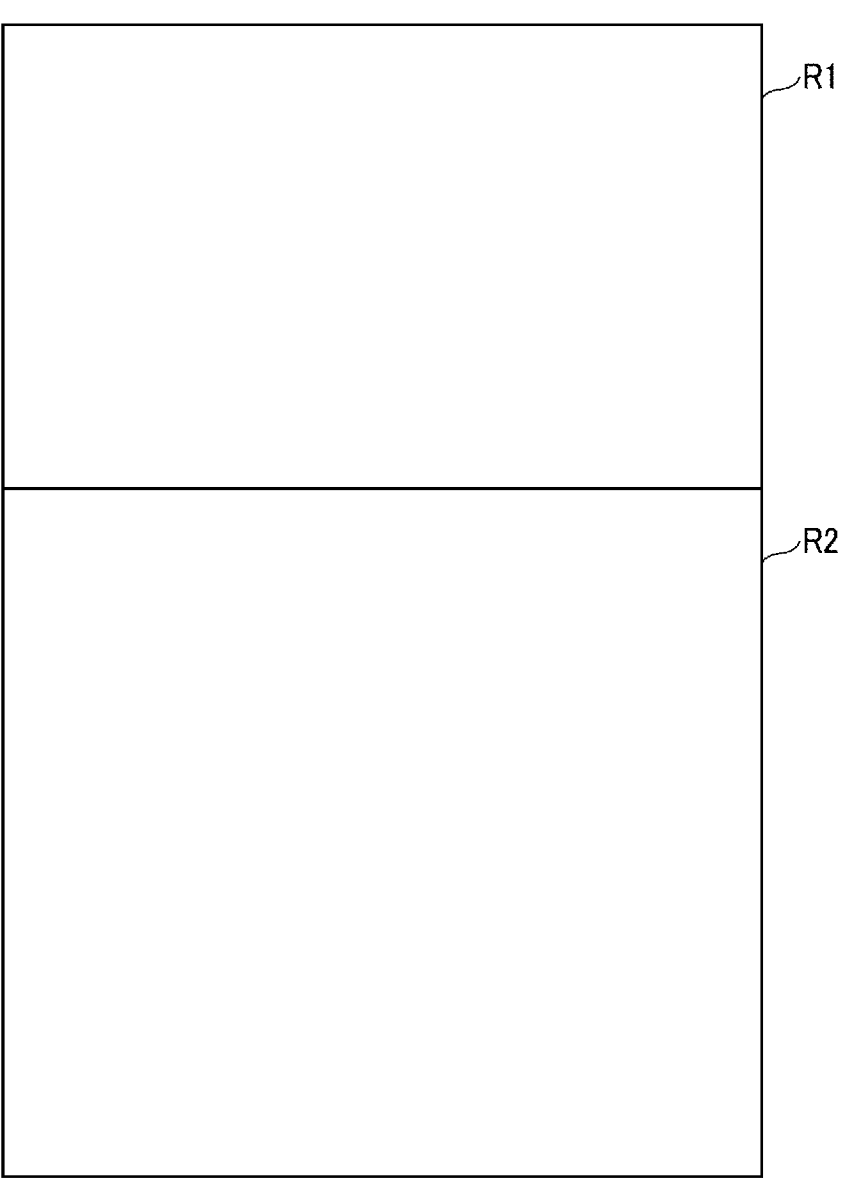
FIG. 11 is a plan view of a first area and a second area on a surface of an object.

FIG. 11 is a plan view of a first area R1 and a second area R2 on the surface of the object 3000. For example, the second area R2 is wider than the first area R1. The discharge head 10 discharges the liquid from the first number of the nozzle holes N (the first number of nozzles to be driven) to the first area R1 at the start of the application of the liquid to the object to perform the first discharge operation, thereby coating the first area R1. The discharge head 10 discharges the liquid from the second number of the nozzle holes N (the second number of nozzles to be driven) to the second area R2 at the start of the application of the liquid to the object to perform the second discharge operation, thereby coating the second area R2. The positions, sizes, and shapes of the first area R1 and the second area R2 are not particularly limited.

The discharge head 10 performs the first dummy discharge operation to discharge a first total amount of the liquid to the receptacle 120 different from the object 300 before the first discharge operation. In the first dummy discharge operation, the liquid that does not contribute to the applying of the liquid to the object (i.e., coating) is discharged. The discharge head 10 performs the second dummy discharge operation to discharge a second total amount of the liquid to the receptacle 120 before the second discharge operation. In the second dummy discharge operation, the liquid that does not contribute to the applying of the liquid to the object is discharged.

The second total amount of the liquid discharged in the second dummy discharge operation is larger than the first total amount of the liquid discharged in the first dummy discharge operation. The discharge head 10 discharges the first total amount of the liquid in the first dummy discharge operation. The discharge head 10 discharges the second total amount of the liquid larger than the first total amount of the liquid in the second dummy discharge operation.

According to the liquid discharge apparatus 200, the first total amount of the liquid discharged in the first dummy discharge operation and the second total amount of the liquid discharged in the second dummy discharge operation are adjusted. Accordingly, the liquid pressure drop and the viscosity drop at the start of coating can be reduced while reducing the first total amount and the second total amount, thereby preventing the coating quality from deteriorating. Thus, the liquid discharge apparatus 200 can improve the coating quality.

The liquid discharge apparatus 200 uses a number of the nozzle holes N larger than the first number of the nozzle holes N to perform the first dummy discharge operation. The controller 500 sets the first number of the nozzle holes N in the first discharge operation at the start of the application of the liquid to the object as a reference, and controls the first dummy discharge operation so that the liquid is discharged from the number of the nozzle holes N larger than the first number of the nozzle holes N in the first dummy discharge operation.

The discharge head 10 discharges the liquid from a third number of the nozzle holes N larger than the first number of the nozzle holes N used in the first discharge operation to perform the first dummy discharge operation. Thus, the liquid discharge apparatus 200 can shorten the time of the first dummy discharge operation. The liquid discharge apparatus 200 may perform the first dummy discharge operation with the same number of nozzle holes N as the first number of the nozzle holes N.

The liquid discharge apparatus 200 uses a number of the nozzle holes N larger than the second number of the nozzle holes N to perform the second dummy discharge operation. The controller 500 sets the second number of the nozzle holes N in the second discharge operation at the start of the application of the liquid to the object as a reference, and controls the second dummy discharge operation so that the liquid is discharged from the number of the nozzle holes N larger than the second number of the nozzle holes N in the second dummy discharge operation.

The discharge head 10 discharge the liquid from a fourth number of the nozzle holes N larger than the second number of the nozzle holes N used in the second discharge operation to perform the second dummy discharge operation. Thus, the liquid discharge apparatus 200 can shorten the time of the second dummy discharge operation. The liquid discharge apparatus 200 may perform the second dummy discharge operation with the same number of nozzle holes N as the first number of the nozzle holes N.

The liquid discharge head includes multiple valves 12 to respectively open and close the multiple nozzle holes N and multiple valve drivers 13 to respectively drive (open and close) the multiple valves 13. The circuitry controls the multiple valve driver 12 of the liquid discharge head 10 to open a first number of the multiple valves 12 for a first valve opening time to discharge the liquid to the first area of the object to perform the first discharge operation. The first valve opening time is, for example, a length of time the valve driver 13 opens the valve 12 to open the nozzle hole N in one discharge. The circuitry controls the multiple valve driver 12 of the liquid discharge head 10 to open a third number of the multiple valves for a third valve opening time longer than the first valve opening time in the first dummy discharge operation. The liquid discharge apparatus 200 can make the valve opening time in the first dummy discharge operation longer than the first valve opening time in the first discharge operation. Thus, the liquid discharge apparatus 200 can shorten the time of the first dummy discharge operation. The liquid discharge apparatus 200 may perform the first dummy discharge operation for the same valve opening time as the first valve opening time.

The circuitry controls the multiple valve driver 12 of the liquid discharge head 10 to open a second number of the multiple valves for a second valve opening time to discharge the liquid to the second area of the object to perform the second discharge operation. The second number of the multiple valves is larger than the first number of the multiple valves. The second valve opening time is, for example, the length of time the valve driver 13 opens the valve 12 to open the nozzle hole N in one discharge. The circuitry controls the multiple valve driver 12 of the liquid discharge head 10 to open a fourth number of the multiple valves for a fourth valve opening time longer than the second valve opening time in the second dummy discharge operation. The liquid discharge apparatus 200 can make the valve opening time in the second dummy discharge operation longer than the second valve opening time in the second discharge operation. Thus, the liquid discharge apparatus 200 can shorten the time of the second dummy discharge operation. The liquid discharge apparatus 200 may perform the second dummy discharge operation for the same valve opening time as the second valve opening time.

In the liquid discharge apparatus 200 according to the present embodiment, the discharge head 10 performs the dummy discharge operation when a non-discharge time, during which the liquid is not discharged from the multiple nozzle holes, exceeds a predetermined abnormal discharge occurrence time T1. The controller 500 measures the non-discharge time, and when the non-discharge time exceeds the abnormal discharge occurrence time T1, the controller 500 causes the discharge head 10 to perform the dummy discharge operation.

The controller 500 can change the abnormal discharge occurrence time T1 corresponding to the number of nozzles to be driven at the start of the application of the liquid to the object. The controller 500 can make the abnormal discharge occurrence time T1 longer when the number of nozzles to be driven at the start of the application of the liquid to the object is small than when the number of nozzles to be driven at the start of the application of the liquid to the object is large.

The controller 500 may determine the abnormal discharge occurrence time T1 based on the amount of change in viscosity per unit time due to the thixotropy of the liquid. For example, data on the amount of change in viscosity per unit time due to the thixotropy of the liquid may be acquired by an experiment or the like in advance. The memory of the controller 500 can store data indicating the relation between the amount of change in viscosity per unit time due to the thixotropy of the liquid and the abnormal discharge occurrence time T1. The controller 500 can determine the abnormal discharge occurrence time T1 based on the data stored in the memory.

The controller 500 may determine the abnormal discharge occurrence time T1 based on the amount of change in liquid pressure per unit time. The memory of the controller 500 can store data indicating the relation between the amount of change in liquid pressure of the liquid in the discharge head 10 per unit time and the abnormal discharge occurrence time T1. The controller 500 can determine the abnormal discharge occurrence time T1 based on the data stored in the memory.

The present disclosure is not limited to the above-described embodiment, and numerous additional modifications and variations are possible without departing from or changing the technical idea of the present disclosure.

Embodiments of the present disclosure includes the liquid discharge method performed by the above described liquid discharge apparatus 200, and a non-transitory storage medium storing a plurality of instructions which, when executed by one or more processors, causes the processors to perform the liquid discharge method.

As described above, according to the present disclosure, the liquid discharge apparatus can be provided that prevents the liquid application quality at the start of the application of the liquid to the object from deteriorating.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A liquid discharge apparatus comprising:

a liquid discharge head having multiple nozzle holes and configured to discharge a liquid from the multiple nozzle holes to apply the liquid to an object; and circuitry configured to cause the liquid discharge head to:

discharge the liquid from a first number of the multiple nozzle holes to a first area of the object at a start of an application of the liquid to the object as a first discharge operation;

discharge a first total amount of the liquid to a receptacle different from the object before the first discharge operation as a first dummy discharge operation;

discharge the liquid from a second number of the multiple nozzle holes to a second area of the object at the start of the application of the liquid as a second discharge operation, the second number larger than the first number; and discharge a second total amount of the liquid larger than the first total amount to the receptacle before the second discharge operation as a second dummy discharge operation, wherein the first total amount of the liquid discharged in the first dummy discharge operation corresponds to a first sum of the liquid discharged from the first number of the multiple nozzle holes, and the second total amount of the liquid discharged in the second dummy discharge operation corresponds to a second sum of the liquid discharged from the second number of the multiple nozzle holes, and wherein the liquid discharge head includes:

multiple valves disposed in the liquid discharge head and configured to respectively open and close the multiple nozzle holes; and multiple valve drivers disposed in the liquid discharge head and configured to respectively drive the multiple valves.

2. The liquid discharge apparatus according to claim 1, wherein the circuitry is further configured to cause the liquid discharge head to:

discharge the liquid from a third number of the multiple nozzle holes to the receptacle as the first dummy discharge operation, the third number larger than the first number; and discharge the liquid from a fourth number of the multiple nozzle holes to the receptacle as the second dummy discharge operation, the fourth number larger than the second number.

3. The liquid discharge apparatus according to claim 1, wherein the circuitry is further configured to control the multiple valve drivers of the liquid discharge head to:

open a first number of the multiple valves for a first valve opening time to discharge the liquid to the first area of the object as the first discharge operation;

open a second number of the multiple valves for a second valve opening time to discharge the liquid to the second area of the object as the second discharge operation, the second number of the multiple valves larger than the first number of the multiple valves;

open a third number of the multiple valves for a third valve opening time longer than the first valve opening time to discharge the liquid to the receptacle as the first dummy discharge operation; and open a fourth number of the multiple valves for a fourth valve opening time longer than the second valve opening time to discharge the liquid to the receptacle as the second dummy discharge operation.

4. The liquid discharge apparatus according to claim 1, wherein the liquid discharge head has a liquid chamber communicating with each nozzle hole, and the multiple valves and the multiple valve drivers are disposed in the liquid chamber.

* * * * *